United States Patent
Kjesbu et al.

(10) Patent No.: US 7,336,294 B2
(45) Date of Patent: Feb. 26, 2008

(54) ARRANGEMENT AND METHOD FOR IMPROVED COMMUNICATION BETWEEN PARTICIPANTS IN A VIDEOCONFERENCE

(75) Inventors: Snorre Kjesbu, Slependen (NO); Finn Helge Lunde, Asker (NO); Petter Muren, Nesbru (NO); Trygve Frederik Marton, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 672 days.

(21) Appl. No.: 10/814,863

(22) Filed: Mar. 31, 2004

(65) Prior Publication Data
US 2004/0239755 A1 Dec. 2, 2004

(30) Foreign Application Priority Data
Apr. 7, 2003 (NO) .................................. 20031567

(51) Int. Cl.
*H04N 7/14* (2006.01)
(52) U.S. Cl. ................ 348/14.16; 348/14.08; 348/14.1
(58) Field of Classification Search .. 348/14.01–14.09, 348/14.1, 14.11, 14.12, 14.13, 14.16; 370/260, 370/261
See application file for complete search history.

(56) References Cited
U.S. PATENT DOCUMENTS

| | | | |
|---|---|---|---|
| 5,400,069 A | 3/1995 | Braun et al. |
| 5,612,734 A | 3/1997 | Nelson et al. |
| 5,619,254 A | 4/1997 | McNelley |
| 5,639,151 A | 6/1997 | McNelley et al. |
| 5,801,758 A | 9/1998 | Heirich |
| 5,890,787 A | 4/1999 | McNelley et al. |
| 6,046,767 A | 4/2000 | Smith |
| 6,172,703 B1 | 1/2001 | Lee |
| 2001/0038412 A1 | 11/2001 | McNelley et al. |
| 2002/0041325 A1 | 4/2002 | Maggioni |
| 2002/0063774 A1 | 5/2002 | Hillis et al. |
| 2003/0058334 A1 | 3/2003 | Boyden et al. |

FOREIGN PATENT DOCUMENTS

JP      2002-049367      *   2/2002

* cited by examiner

*Primary Examiner*—Melur Ramakrishnaiah
(74) *Attorney, Agent, or Firm*—Oblon, Spivak, McClelland, Maier & Neustadt, P.C.

(57) ABSTRACT

An arrangement and a method of a videoconferencing end-point provide for eye contact between users at different sites. A conference camera is placed in the light beam of a projector apparatus without degrading the camera-captured view by the projector light. This is provided by generating a black spot in the light beam covering the camera lens, and by adjusting the position and/or size of the black spot according to a camera position detector, which may be the camera itself or one or more light sensors around and close to the camera lens.

20 Claims, 8 Drawing Sheets

ARRANGEMENT AND METHOD FOR IMPROVED COMMUNICATION BETWEEN PARTICIPANTS IN A VIDEOCONFERENCE

RELATED APPLICATION

This application claims priority under 35 U.S.C. § 119 or 365 to Norwegian Application No. 20031567, filed Apr. 7, 2003. The entire teachings of the above application are incorporated herein by reference.

BACKGROUND

Face-to-face conversation is usually recognized as the preferred form of human communication. Therefore, a goal of videoconferencing systems is to achieve communication as close as possible to real face-to-face conversation.

Typical video conferencing systems include a display screen and a camera for each site. During video conferencing, the user(s) of a first site observes an image of the second site on the display screen. At the same time, an image of the first site is captured by the camera and projected on the display screen at the second site. The user(s) at the second site observes the image of the first site on the second screen while a camera at the second site simultaneously captures an image of the second site and projects that image upon the screen at the first site.

In the prior art, the projector and the camera associated with the same site operate on different optical paths. When a user at the first site is looking at the image of the second site on the first screen, he/she will be looking away from the camera. For example, consider a video conferencing system that uses a conventional monitor as the display device and a camera mounted on the side, top or bottom of the monitor housing. Because of the closeness of the user to the monitor and the camera being positioned at the periphery of the monitor's display screen, the perspective or angle at which the image of the user is captured is not optimum and the image captured shows the user as looking away from the camera. Thus, the first camera receives an image of the first user that is indirect. As the image from the first camera is projected onto the second screen, the second user also sees an indirect image of the first user (i.e., the second user sees the first user's image as looking away from the line of sight of the second user), and thus there is no "eye contact" between users. Only when the first user is looking directly at the camera (and not at the image of the second user upon the first screen) will there be eye contact between the second user (looking at the second screen) and the first user (looking into the camera). However, users rarely, if ever, change their head position and eye contact to focus on the camera instead of the display, and even when they do, such adjustments in user head position are not natural and require significant concentration and effort. Such prior art systems are problematic because of their inability to capture a direct, full-face image of the user. In summary, there is never a time when both users are looking directly at each other, seeing full-face images upon the screen and having eye contact.

U.S. Pat. No. 5,400,069 discloses a videoconferencing system providing eye contact by means of a special purposed back projection screen. Both projector and camera are positioned behind the screen. The screen is simultaneously translucent with respect to the projector and transparent with respect to the camera and includes segments that discriminate between projected light and light to be captured by the camera based upon polarization or angle. Light from the opposite side of the camera and projector side, e.g. reflected light from the participants, is passed and vertical polarized through the screen, and captured by the camera. Light from the projector reflected on the screen is horizontal polarized, and will not be captured by the camera, because it allows absorption of vertical polarized light only. Thus, participants looking at the projected picture on the screen will also seem to look at the camera behind the screen, and eye contact will be established.

However, U.S. Pat. No. 5,400,069 requires a tailored and back projected screen. Front projections on a simple screen or even on a wall are today extensively adapted as a preferred solution for displaying presentations and information to a group of people in a designed meeting room.

SUMMARY

There is a need for a videoconference system with conventional front projection providing eye contact without capturing interfering light from the projector.

The present invention relates to videoconferencing systems and in particular to video capturing and displaying systems providing eye contact between videoconference participants.

In particular, the present invention discloses an arrangement of a videoconference end-point, at least including a video projector emitting a beam of light creating one or more images on a projective surface, for preventing an end-point associated video camera, directed towards the video projector and residing within said beam of light, from capturing the beam of light, wherein the arrangement includes a beam area generator adapted to generate an area of light or absence of light in said beam replacing a part of, and/or adding a part to, said one or more images, to cover at least a part of said video camera, wherein size and shape of said area is determined from a camera position detector.

In accordance with the invention, a method of operating a videoconference end-point comprises emitting a beam of light from a video projector to create one or more images on a projective surface; directing an end-point associated video camera towards the video projector, the camera residing within said beam of light; generating an area of light or absence of light in said beam to replace a part of, or add a part to, said one or more images; and adjusting at least the position of said area of light or absence of light to cover at least a part of said video camera to thereby prevent the video camera from substantially capturing the beam of light.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention use standard front projection equipment as the generator for displaying the image at videoconferences. That is, the invention is adapted to allow use of existing presentation equipment already installed in meeting rooms, lecture rooms, etc. as the display means of a video conference end-point, while still providing eye contact between participants on different sites.

Figure 1:
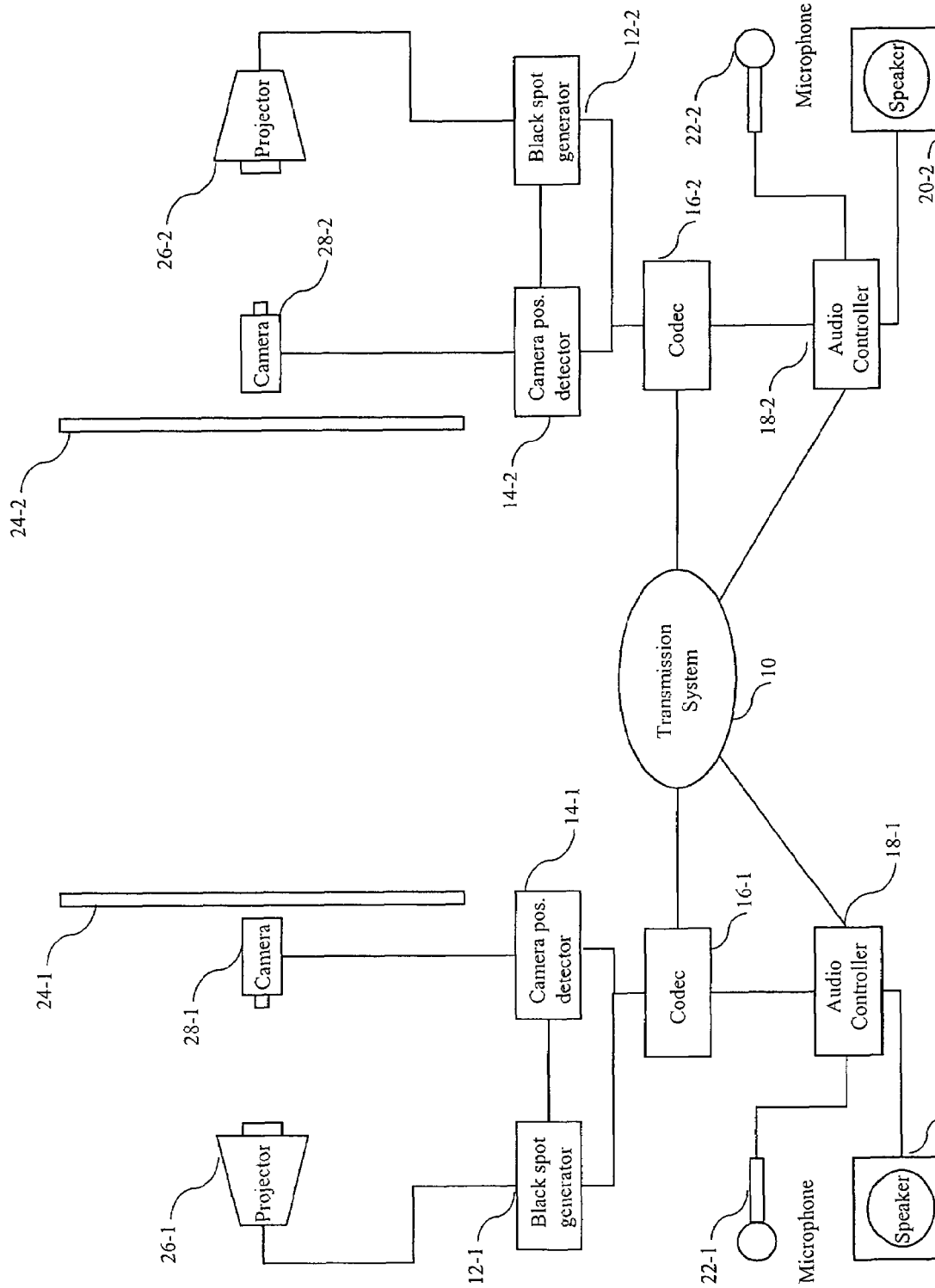
FIG. 1 is a block diagram of a videoconferencing system employing a preferred embodiment of the present invention.

FIG. 1 shows a block diagram of a videoconferencing system employing a preferred embodiment of the present invention. The system includes the following elements that are generally common to videoconferencing systems at each conferencing site: codec 16-1, 16-2; audio controller 18-1, 18-2; speaker 20-1, 20-2; microphone 22-1, 22-2; projector 26-1, 26-2; camera 28-1, 28-2; screen 24-1, 24-2. The codecs 16-1, 16-2 and audio controllers 18-1, 18-2 process video and audio signals, respectively, that are carried through a transmission system 10. The system further includes beam area or black spot generator 12-1, 12-2 that is adapted to generate an area of light or absence of light in a beam that is emitted by the projector 26-1, 26-2 and directed towards screen 24-1, 24-2. Camera position detector 14-1, 14-2 detects position, orientation, tilt and changes therein of the camera 28-1, 28-2, and provides such information to the beam area generator 12-1, 12-2 for determining the size, shape, placement and adjustment of the area of light or absence of light so as to cover at least a part of the camera.

Figure 2:
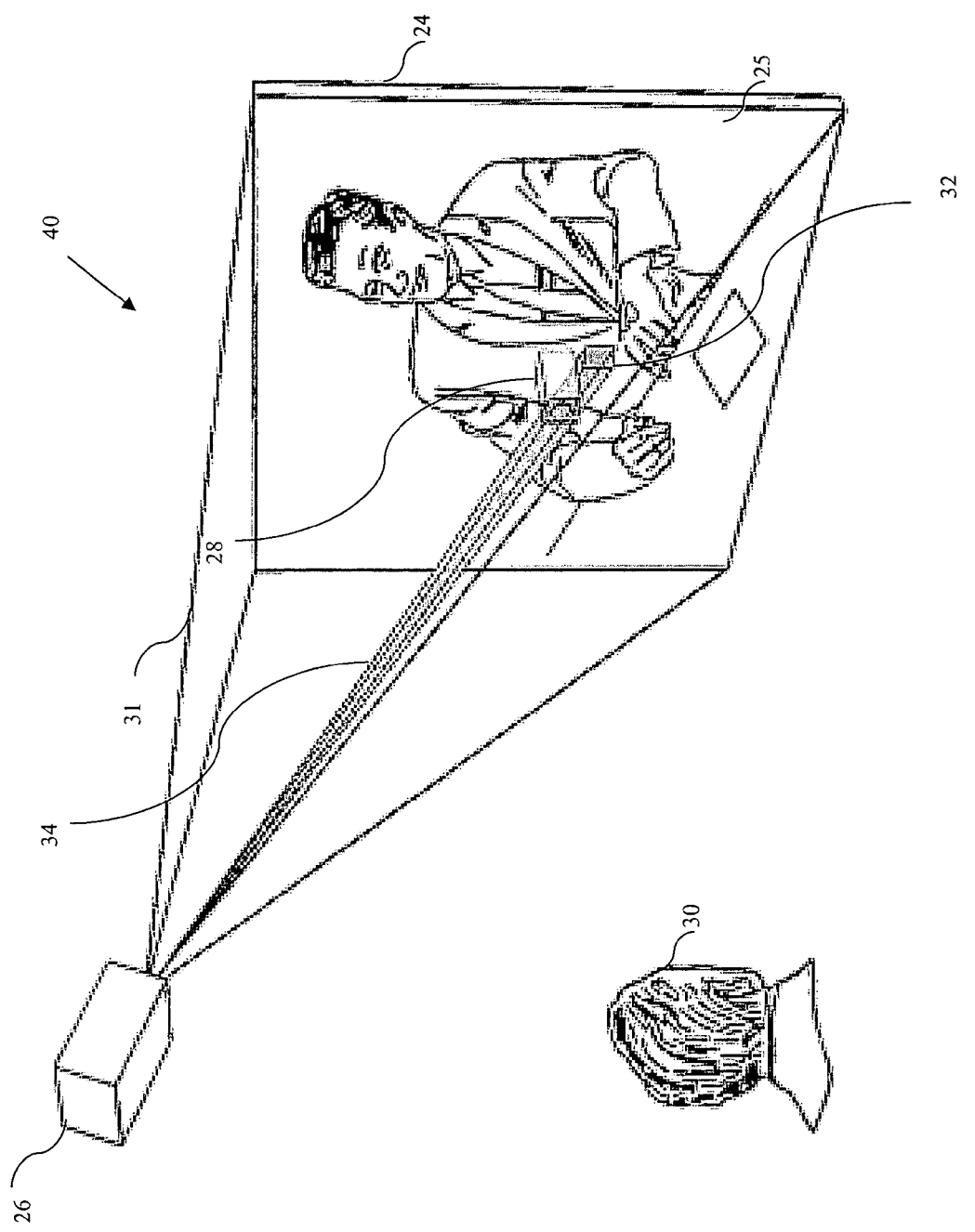
FIG. 2 illustrates an end-point in operation according to a preferred embodiment of the present invention.

Referring to FIG. 2, an end-point arrangement 40 according to an example embodiment of the present invention is shown. A user 30 is illustrated watching an image 25 of the far end site projected upon a surface 24, e.g., linen cloth or screen, by projector 26 that receives the picture from the end-point codec 16 (FIG. 1). To form the image 25, the projector 26 projects a beam of light 31 towards the surface 24. To achieve good eye contact, the camera 28 of the end-point is placed substantially in the middle of the projected image 25 supported by, e.g., a bar (not shown). It should be possible to move the position of the camera in at least one direction, e.g., vertically, through manual means, or optionally by means of an engine drive, or other suitable means.

In conventional videoconferencing systems using projectors as displaying means, placing the camera in front of the screen would not be recommended because the camera would capture the light from the projector, thus presenting a disturbed image at the far end side. This problem is solved by the present invention by forming a black area or spot (or an area/spot of alternative light or absence of light) in the image substantially covering the light input of the camera, having an appropriate position and size relative to the camera, or the light input of the camera, for preventing deterioration of the image transmitted to the far end site(s). In FIG. 2 a portion 34 of the projected beam 31 is shown covering the light input of the camera 28. As described further herein, the beam area generator 12 (FIG. 1) is adapted to generate an area of light or absence of light that corresponds to this beam portion 34. A region 32 of the projected image 25 that corresponds to the beam portion 34 is also shown.

The system of one embodiment of the invention includes means for camera position detection 14-1, 14-2 and beam area or black spot generation 12-1, 12-2 (FIG. 1). The camera position detection means 14-1, 14-2 must output the positions relative to the screen 24 or the pixels in the image corresponding to the required area of the light input of the camera, normally the camera lens, into which light from the projector 26 is prevented to fall. In one embodiment, the camera position detector 14-1, 14-2 (FIG. 1) comprises light detection means that includes one or more light sensors, preferably light absorbing diodes, arranged in the surroundings of the camera lens 50 as exemplified in FIGS. 3-6. As shown, an area or black spot 52 that covers the light input to the camera lens 50 of camera 28 has upper and lower horizontal edges 52a, 52b, respectively and left and right vertical edges 52c, 52d, respectively.

Figure 3:
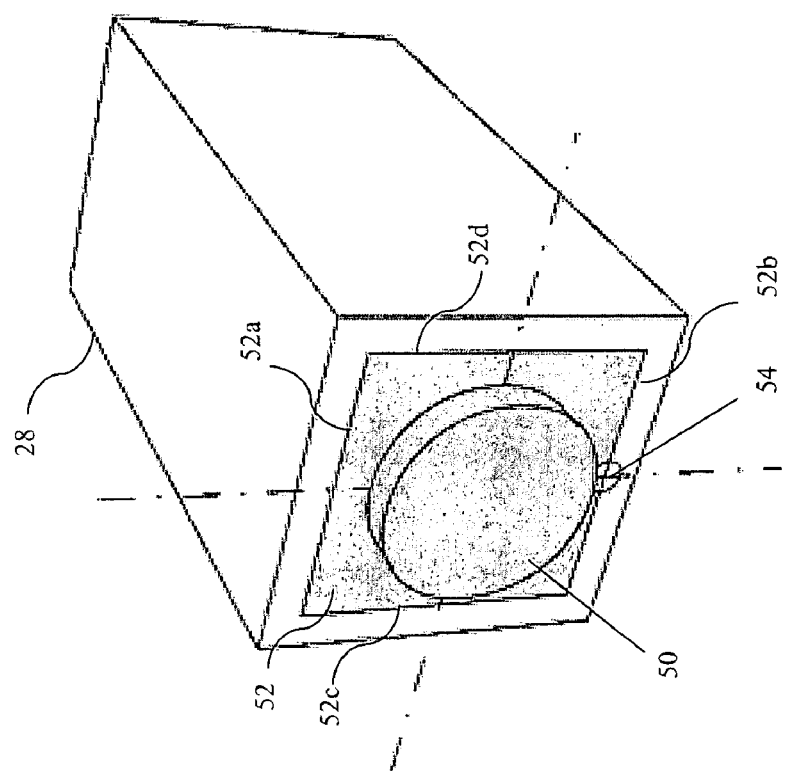
FIGS. 3-6 illustrate various examples of placements of light sensors around a videoconferencing camera.

The number of sensors is determined by the desired accuracy of the black spot relative to the light input of the camera, and the freedom of movement of the camera. For example, if the horizontal position of the camera is fixed, and a square shaped black spot is acceptable, only one light sensor 54 would be required, as illustrated in FIG. 3, where the light sensor is positioned right below the camera lens. In this case, the area size and the vertical edges 52c, 52d of the squared black spot are known, and consequently, the vertical edges 52c, 52d and the relationship between the horizontal edges 52a, 52b of the square are known. By moving the position of the lower horizontal edge 52b of the black square upwards from an initial position under the sensor 54, the light sensor may signalize when the light absorption is increasing (or decreasing if the edge position is adjusted downwards from initially above the sensor). The position of the lower horizontal edge 52b is then set to current position, and the position of the upper horizontal edge 52a is set correspondingly according to said fixed relationship. Of course, the light sensor could also be placed above the camera lens 50, using the upper horizontal edge 52a as the guidance edge for positioning the two horizontal edges.

Figure 4:
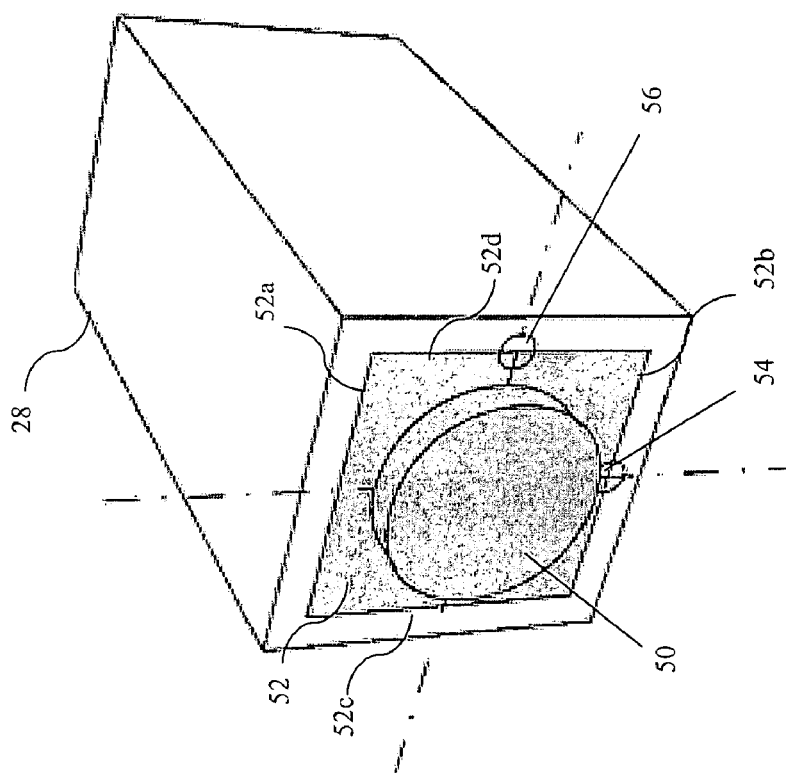

If the positions of the vertical edges are not fixed, e.g., due to an additional engine drive in the horizontal direction, an additional light sensor 56 is placed on the right or left side of the camera lens as illustrated in FIG. 4. The positions of the vertical edges 52c, 52d are then determined as explained above by moving one of them in the horizontal direction and stopping at a change of light absorption in the sensors.

Figure 5:
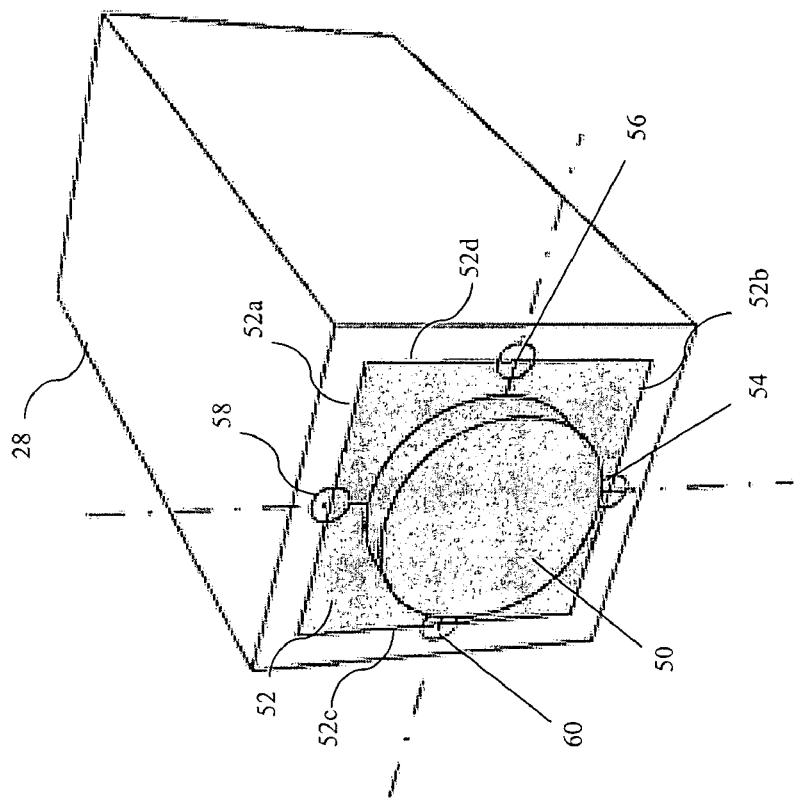

When the size of the squared black spot should be variable, e.g., due to changes in the direction and tilt of the camera, light sensors 56, 60 on both sides of the lens as well as sensors 54, 58 on the respective lower and upper side are required, as shown in FIG. 5. The edges 52a, 52b, 52c, 52d then are adjusted completely independently from each other.

Figure 6:
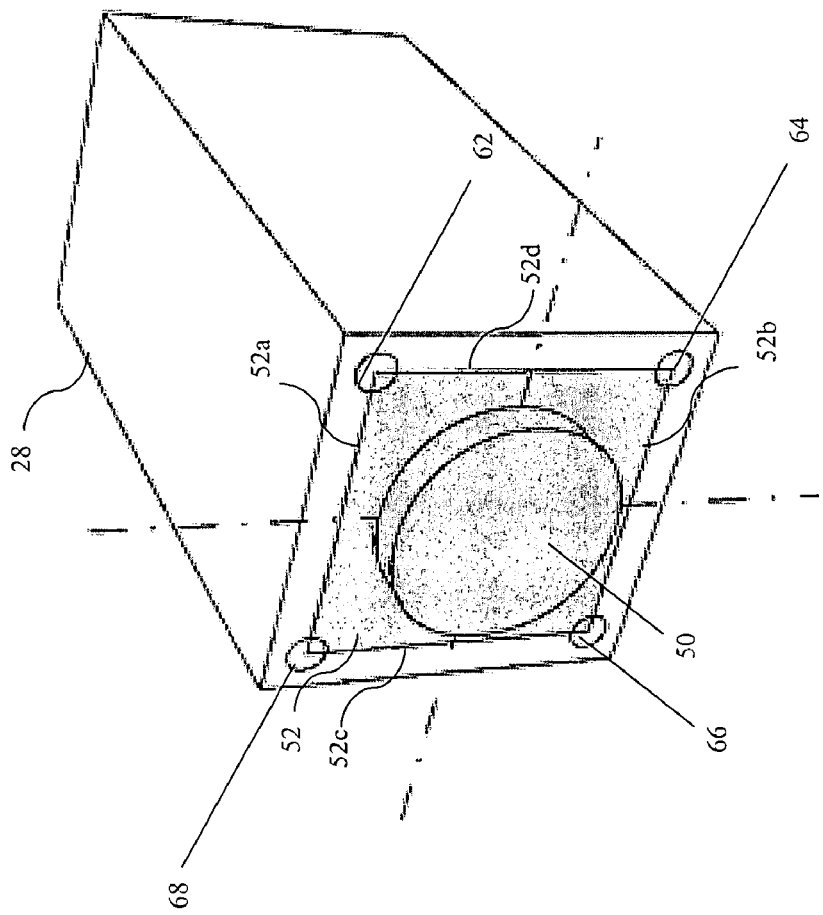

Other patterns of light sensors around the camera lens may also be applicable dependent on the required accuracy, the shape of the black spot, and the camera's freedom of movement. One example is shown in FIG. 6, wherein the black spot area is defined by four corner light sensors 62, 64, 66, 68.

In another embodiment of the present invention, input to the camera position detection is captured by the camera lens itself. The shape of the black spot would then correspond to the shape of the camera lens, which in most cases is circularly shaped. The black spot generator and the camera lens must cooperate to find the optimal position and size of the black spot. As already indicated, the area of the displayed picture occupied by the black spot should be as small as possible, but at the same time sufficiently large to prevent the camera from capturing interfering light from the projector.

There are various ways of initialising the system according to the present invention. In the case of a square shaped black spot and light absorbing sensors, the black spot initially covers the whole display field of the screen. One or at least some of the edges then moves towards the centre of the original black spot until the sensor(s) associated with the respective edge sense(s) the camera position. The sensor(s) then transmit a signal to the black spot generator indicating that the current edge position(s) is/are to be used. The signal transmission could be trigged when a certain percentage of projector light is sensed by the sensor(s), so that the movement(s) stop(s) at a time when the edge(s) is/are crossing the light sensor. The only requirement for the camera positioning is that the camera has to reside within the initial black spot (before adjustment).

Alternatively, the black spot may initially reside within the camera lens. One or at least some of the edges then move(s) outwards to the associated sensor(s) until it/they sense(s) decreasing or absence of projector light. The sensor(s) then transmit a signal to the black spot generator indicating that the current edge position(s) is/are to be used. As before, the signal transmission could be trigged when a certain percentage of projector light is sensed by the sensor(s), so that the movement(s) stop(s) at a time when the edge(s) is/are crossing the light sensor. In this case, the black spot generator must know the position of the camera to place the initial black spot within the camera lens.

In the case of a circular shaped black spot, when the light capturing means of the camera itself provides input to the camera position detection, the initialization may be carried out by first placing a small circular shaped black spot in the centre of and within the camera lens. Then the black spot generator magnifies the spot until the projector light that is passing the camera lens approximates zero, or in other words, until the projector light is no longer interfering with the picture captured by the camera lens. When this occurs, the black spot generator is provided with a signal to indicate that the current size of the black spot is appropriate, and the generator stops magnifying the spot. In this case, the black spot generator must know the position of the camera to place the initial circularly black spot in the centre and within the camera lens.

The purpose of the initialisation, in addition to protecting the camera lens from projector light all from the start, is to define a reference position and size of the black spot that may be used at changes in the position, orientation and tilt of the camera during operation. According to a preferred embodiment of the invention, one unity of change corresponds to a predefined number of pixels of the image projected on the screen. As an example, consider the arrangement of FIG. 2. Here, repositioning of the camera is allowed in one direction only, e.g. provided by an engine drive moving the bar to which the camera is attached, in the vertical direction. The movements are carried out one step at a time, wherein one step represents a fixed distance of movement. This distance of movement may easily be converted to a predefined number of pixels by the black spot generator dependent on the size of the image. Now, when the engine drive moves the camera a number of steps upwards or downwards, the black spot generator regenerates the black spot by moving the upper and lower edges the number of steps times said predefined number of pixels. In this way, the black spot will follow the movements of the camera in the vertical direction. In the case of minimizing or magnifying the image projection on the screen, the predefined number of pixels should be changed accordingly. For this purpose, the black spot generator is preferably in communication with the zooming functionalities of the projector. Similar repositioning mechanism in the horizontal direction and in the case of a circularly shaped black spot will be obvious for a person skilled in the art.

Changes in orientation and tilt of the camera would also require changes in the positioning and optionally the size of the black spot. A degree unit of orientation or tilt may also be associated with a number of pixels in the image, and a regeneration of the black spot representing a movement is carried out corresponding to the amount of orientation or tilt. A change of orientation or tilt may similarly correspond to a size adjustment of a predefined amount of pixels.

Figure 7B:
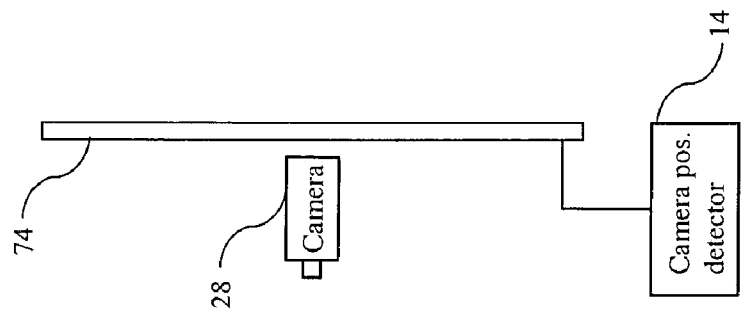
FIG. 7B is a block diagram of another alternative embodiment according to the principles of the present invention.
Figure 7A:
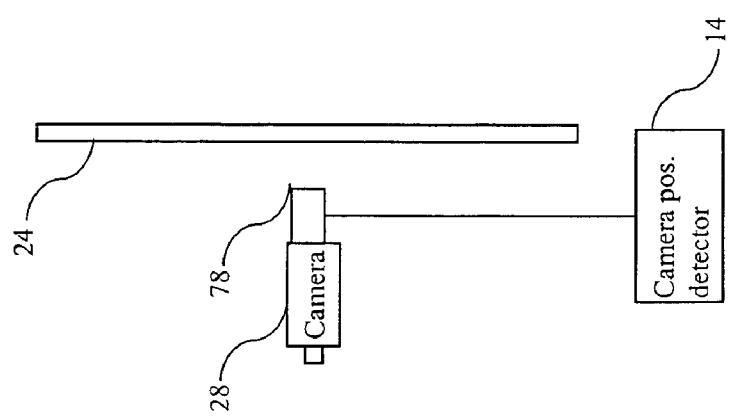
FIG. 7A is a block diagram of an alternative embodiment in accordance with the present invention.

In an alternative embodiment of the invention, the black spot follows the movements of the camera independently of the movement source. As shown in the block diagram of FIG. 7A, a camera position detector 14 includes one or more auxiliary cameras 78 mounted behind the main camera 28 directed towards the screen 24. The auxiliary camera(s) 78 capture one or more spots of the image displayed on the screen. The image spots are transmitted to the black spot generator, which is configured to recognize the image spots and to identify their relative positions within the image. Taking into account the direction of the auxiliary cameras, the distance between the camera and the screen, and the orientation and tilt of the camera (optionally detected by one or more simple telemeters), the position of the camera within the image area could easily be calculated. Thus, the black spot generator is allowed to generate a black spot always "attached" to the camera within the image area.

In still another embodiment of the invention, the main camera itself is again used as input for the camera position detector. When the amount of projector light increases due to camera movement relative to the projector, a process is initiated in the black spot generator generating a short glimpse of a predefined dummy light value (e.g. black) in all the image pixels, one at a time, not noticeable for an image viewer. At the time the camera captures this light value, the black spot generator notices which pixel that currently is being assigned the dummy value. When the process has gone through all the pixels, those pixels noticed by the black spot generator then forms the regenerated black spot in the image. This process may also be used at initialization, starting with e.g., a black image being traversed by a light value allowing the black spot generator to similarly detect the pixels forming the initial black spot.

In a further embodiment of the present invention, camera position detector means is incorporated in the screen. This is illustrated in the block diagram of FIG. 7B with the camera position detector 14 connected to a screen 74 with light sensitivity feature. The screen 74 is adapted to detect the area on which the image is projected. In addition, as the camera is placed within the spotlight of the projector, it forms a shadow on the screen. The relative position of the shadow in the projected image will also be detectable by the light sensitivity features of the screen. Since the camera itself forms the shadow, the black spot could coincide with the shadow. The position and size of the shadow could be an approximate indication of the size and position of the black spot, or the black spot could be a direct copy.

Generally, the task of the black spot generator is to determine which of the image pixels that is to form the black spot on basis of the input from the camera position detector. It also has to regenerate the black spot to adjust its position and optionally the size during a conference according to changes in the input from the camera position detector. The black spot generator may be an integrated part of the codec or the projector associated with the end-point equipment, or as a standalone device in communication with one or both of them. In all cases, the values of pixels that the black spot generator has determined to form the black spot is removed by a black or another non-interfering colour value, either right after the decoding process in the codec, or in connection with the image generation process in the projector.

The principle of the present invention is not limited to the end-point arrangement wherein the camera is placed in front of the screen or the linen cloth. In addition, when the camera is fixed on, integrated in, or even mounted behind the screen, the inventive features of the present invention would also be useful. When the camera is in a fixed position on the screen, only the initialization part of the present invention is required, but a black spot still has to be generated. When the camera is placed behind the screen, the screen has to be translucent with respect to the projector light to reflect the projected image to the viewers, but transparent with respect to the room light allowing the camera to "see" through the screen. This kind of screen technology is known in the art of optics, and is, i.a., used in projecting advertisement on shop windows.

Figure 8:
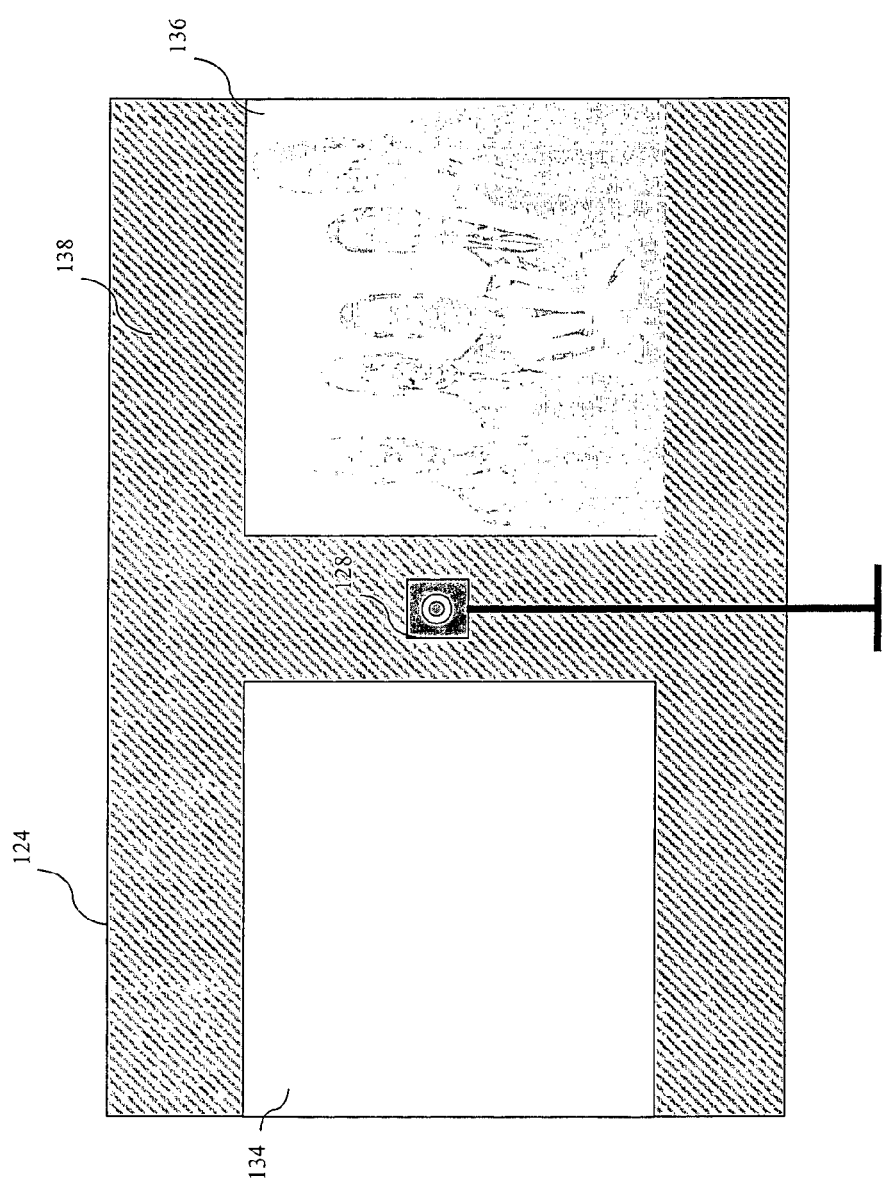
FIG. 8 illustrates an end-point in operation according to yet another alternative embodiment of the present invention.

Note that the specific terms used in the above description are not limiting the scope of the invention as defined in the independent claims. As an example, the term "camera position detector" does not exclude the case of separating the light input of the camera with the rest of the camera, as when the camera lens is separated from the camera by an optical guide. In this case, it is the position of the lens, and not the camera, that is controlling the position and size of the spot. Further, the spot may be of any shape, and may be filled with any kind of light (or absence of light) that is appropriate for the specific application. Further, the beam of light from the projector apparatus is not limited to create only one image. An example of the latter is shown in FIG. 8. Here, the beam of light creates two images 134, 136 on the screen 124, and the area 138 of black light is formed as a horizontal H. Note that the camera 128 is positioned such that the area 138 covers the camera 128 for preventing deterioration of the image transmitted to the far end site(s).

The present invention allows for placing and positioning the videoconference camera wherever desired in the projected image to get an optimal eye contact with the participants on the other end, without the use of any special or complex aperture.

Further, the possibility of using standard projectors and screens for the projection of the image allows users to employ existing meeting room displaying equipment as a part of the videoconferencing equipment.

The invention provides good flexibility for tilting, panning and lifting the camera into the perfect position for optimal communication between the participants of a videoconference.

While this invention has been particularly shown and described with references to preferred embodiments thereof, it will be understood by those skilled in the art that various changes in form and details may be made therein without departing from the scope of the invention encompassed by the appended claims.

What is claimed is:

1. An arrangement of a videoconference end-point comprising:
    a projective surface;
    a video projector emitting a beam of light creating one or more images on the projective surface;
    an end-point associated video camera directed towards the video projector and residing within said beam of light;
    a beam area generator adapted to generate an area of light or absence of light in said beam replacing a part of, and/or adding a part to, said one or more images, to cover at least a part of said video camera and thereby prevent the video camera from substantially capturing the beam of light; and
    a camera position detector adapted for determining size and shape of said area, wherein
    the camera position detector is adapted to detect position, orientation and/or tilt and/or changes in position, orientation and/or tilt of the video camera relative to said one or more images and to provide information of the position and changes to said beam area generator for placing and adjusting said area of light or absence of light to cover at least a part of said camera.

2. An arrangement according to claim 1, wherein said camera position detector includes one or more light sensors positioned close to and/or around said video camera adapted to sense and signal to said beam area generator when an edge of said area of light or absence of light is crossing one of the sensor(s).

3. An arrangement according to claim 1, wherein said camera position detector includes said video camera adapted to sense and signal to said beam area generator when a predefined amount and/or distribution of said light beam is captured.

4. An arrangement according to claim 1, wherein said camera position detector includes one or more auxiliary camera(s) directed towards the projective surface each capturing a respective spot of the one or more images that is being transmitted to said beam area generator, wherein the captured spot(s) is/are identified with respect to position(s) within the one or more images which, in addition to the angle and/or position(s) of the auxiliary camera(s) relative to the video camera, is/are used to derive the position, orientation and/or tilt of the video camera.

5. An arrangement according to claim 1, wherein said camera position detector is adapted to generate a glimpse of a predefined dummy light in all pixels of said one or more images, one or a number of pixels at a time, and to detect when the camera position detector captures the dummy light and simultaneously noticing which of the pixels at the time being having the dummy light value assigned, wherein the beam area generator is adapted to define the area by the noticed pixels.

6. An arrangement according to claim 1, wherein said camera position detector includes the projective surface adapted to sense said one or more images and a shadow formed by the video camera, wherein the beam area generator is adapted to define the area from the sensed shadow.

7. An arrangement according to claim 1, wherein said beam area generator is adapted to initialize the position and/or size of said area of light or absence of light by initially generating the area to cover substantially the whole of said one or more images and then shrinking the area until said position detector detects one or more edges of said area.

8. An arrangement according to one of the claim 1, wherein said beam area generator is adapted to initialize the position and/or size of said area of light or absence of light by initially generating the area to cover a part of said one or more images residing within said video camera and then expanding the area until said position detector detects one or more edges of said area.

9. An arrangement according to claim 1, wherein said beam area generator is adapted to use an initial position and/or size of the area as reference, and to carry out subsequent adjustments of position and/or size of the area by associating a mechanical distance of movement of the video camera with a corresponding deviation of the area relative to the reference in image pixels.

10. An arrangement according to claim 1, wherein the camera position detector is integrated in or connected to a codec and/or the video camera.

11. An arrangement according to claim 1, wherein the video camera is placed in front of or behind the projective surface.

12. A method of operating a videoconference end-point comprising:
   emitting a beam of light from a video projector to create one or more images on a projective surface;
   directing an end-point associated video camera towards the video projector, the camera residing within said beam of light;
   generating an area of light or absence of light in said beam to replace a part of, or add a part to, said one or more images; and adjusting at least the position of said area of light or absence of light to cover at least a part of said video camera to thereby prevent the video camera from substantially capturing the beam of light,
   further comprising detecting position, orientation and/or tilt and/or changes in position, orientation and/or tilt of the video camera relative to said one or more images by means of light sensor(s) and/or the video camera itself, and providing information of the changes to adjust said area of light or absence of light according to the detection.

13. A method according to claim 12, further comprising initializing the position and/or size of said area of light or absence of light by initially generating the area to cover substantially the whole of said one or more image, and shrinking the area until said one or more edges of said area is/are detected.

14. A method according to claim 12, further comprising initializing the position and/or size of said area of light or absence of light by initially generating the area to cover a part of said one or more images residing within said video camera, and expanding the area until one or more edges of said area is/are detected.

15. A method of operating a videoconference end-point comprising:
   emitting a beam of light from a video projector to create one or more images on a projective surface;
   directing an end-point associated video camera towards the video projector, the camera residing within said beam of light;
   generating an area of light or absence of light in said beam to replace a part of, or add a part to, said one or more images; and adjusting at least the position of said area of light or absence of light to cover at least a part of said video camera to thereby prevent the video camera from substantially capturing the beam of light,
   further comprising capturing one or more spots of the one or more images from a known position and/or angle relative to the video camera, identifying the captured spot(s) with respect to position(s) within the one or more images, deriving the position, orientation and/or tilt of the video camera from the identified captured spot(s) and said known position and/or angle.

16. A method according to claim 15, further comprising initializing the position and/or size of said area of light or absence of light by initially generating the area to cover substantially the whole of said one or more image, and shrinking the area until said one or more edges of said area is/are detected.

17. A method according to claim 15, further comprising initializing the position and/or size of said area of light or absence of light by initially generating the area to cover a part of said one or more images residing within said video camera, and expanding the area until one or more edges of said area is/are detected.

18. A method of operating a videoconference end-point comprising:
   emitting a beam of light from a video projector to create one or more images on a projective surface;
   directing an end-point associated video camera towards the video projector, the camera residing within said beam of light;
   generating an area of light or absence of light in said beam to replace a part of, or add a part to, said one or more images; and adjusting at least the position of said area of light or absence of light to cover at least a part of said video camera to thereby prevent the video camera from substantially capturing the beam of light,
   further comprising generating a glimpse of a predefined dummy light in all pixels of said one or more image, one or a number of pixels at a time, and detecting when the dummy light is captured by the video camera and simultaneously noticing which of the pixels at the time being having the dummy light value assigned, defining the area of light or absence of light by means of the noticed pixels.

19. A method according to claim 18, further comprising initializing the position and/or size of said area of light or absence of light by initially generating the area to cover substantially the whole of said one or more image, and shrinking the area until said one or more edges of said area is/are detected.

20. A method according to claim 18, further comprising initializing the position and/or size of said area of light or absence of light by initially generating the area to cover a part of said one or more images residing within said video camera, and expanding the area until one or more edges of said area is/are detected.

* * * * *